US009557209B2

(12) United States Patent
Savage et al.

(10) Patent No.: US 9,557,209 B2
(45) Date of Patent: Jan. 31, 2017

(54) LOAD CELL BIN SYSTEM (71) Applicant: Apex Industrial Technologies LLC, Mason, OH (US)

(72) Inventors: Benjamin V. Savage, Loveland, OH (US); Craig S. Whitaker, Fairfield, OH (US); Larry D. O'Cull, Westfield, IN (US); Kent V. Savage, South Lebanon, OH (US)

(73) Assignee: APEX INDUSTRIAL TECHNOLOGIES LLC, Mason, OH (US)

( * ) Notice: Subject to any disclaimer, the term of this patent is extended or adjusted under 35 U.S.C. 154(b) by 119 days.

(21) Appl. No.: 14/557,793

(22) Filed: Dec. 2, 2014

(65) Prior Publication Data

US 2015/0153218 A1 Jun. 4, 2015

Related U.S. Application Data (60) Provisional application No. 61/910,934, filed on Dec. 2, 2013.

(51) Int. Cl.
*G01G 21/22* (2006.01)
*G01G 21/23* (2006.01)
*B65D 6/00* (2006.01)
*B65D 6/04* (2006.01)
*B65D 6/16* (2006.01)
*B65D 6/26* (2006.01)

(52) U.S. Cl.
CPC .............. *G01G 21/22* (2013.01); *B65D 7/24* (2013.01); *G01G 21/23* (2013.01); *B65D 7/30* (2013.01); *B65D 11/18* (2013.01)

(58) Field of Classification Search
CPC .............. B65D 7/24; B65D 7/26; B65D 7/30; B65D 11/18; B65D 11/1866; B65D 11/1893; G01G 21/22; G01G 21/23
See application file for complete search history.

(56) References Cited

U.S. PATENT DOCUMENTS 1,439,450 A * 12/1922 Scott ..................... B65D 7/24
220/4.31
3,304,142 A 2/1967 Rockola
(Continued)

OTHER PUBLICATIONS

PCT, International Search Report and Written Opinion, International Application No. PCT/US2014/068021 (Mar. 4, 2015).

*Primary Examiner* — Randy W Gibson
(74) *Attorney, Agent, or Firm* — Thompson Hine LLP (57) ABSTRACT A reconfigurable bin system for dispensing units, the system having a platform bin and a base member with load cells configured to support the platform bin. The platform bin itself comprises a platform plate, an optional front gate, a rear wall, and a plurality of side walls extending from the front of the platform plate to the rear wall so as to form an open-top bin. The platform plate includes a front flange disposed below the upper surface to define a trough extending across the front of the platform plate. Each of the plurality of side walls includes a rear tab received within a slot in the rear wall and a depending front tab received within the trough. A cap member may be removably secured over the trough to capture the depending front tabs within the trough, thereby securing the plurality of side walls in place.

20 Claims, 7 Drawing Sheets

(56) References Cited

U.S. PATENT DOCUMENTS

| | | | | |
|---|---|---|---|---|
| 4,776,477 A | * | 10/1988 | Walker | B65D 7/24 206/561 |
| 4,809,851 A | * | 3/1989 | Oestreich, Jr. | B65D 7/32 206/511 |
| 5,894,112 A | * | 4/1999 | Kroll | G01G 19/07 177/134 |
| 5,954,576 A | * | 9/1999 | Coulter | G01G 19/42 177/25.17 |
| 6,193,340 B1 | | 2/2001 | Schenker et al. | |
| 6,337,446 B1 | | 1/2002 | Hulburt et al. | |
| 8,606,660 B2 | * | 12/2013 | Liang | G01G 19/42 177/145 |
| 2006/0144607 A1 | * | 7/2006 | Collins | B65D 7/28 174/50 |
| 2009/0178989 A1 | | 7/2009 | Accuardi | |
| 2011/0084069 A1 | * | 4/2011 | Hay | B65D 11/1866 220/4.28 |
| 2011/0180533 A1 | | 7/2011 | Hay et al. | |
| 2013/0146591 A1 | * | 6/2013 | Miller | B65D 11/1893 220/4.29 |
| 2013/0175265 A1 | | 7/2013 | Sommer et al. | |
| 2015/0028028 A1 | * | 1/2015 | Matsuoka | B65D 11/1893 220/7 |

\* cited by examiner

LOAD CELL BIN SYSTEM

This application claims priority to U.S. Provisional Application Ser. No. 61/910,934, filed Dec. 2, 2013, which is expressly incorporated by reference herein in its entirety.

The present application is directed to load cell or scale-like devices used in automated dispensing units for the detection of manually removed stock and, more particularly, to a load cell bin system which enables simplified change-over of bin dimensions and configuration to accommodate changes in dispensed stock.

BACKGROUND

Industrial supply dispensing units often include a plurality of internal compartments accessed via doors or drawers, such as dispensing units with multi-tiered, locker-like or cabinet-of-drawers-like configurations. A user may access an internal compartment in order to manually remove a stocked item such as a tool, a part, a consumable, etc., with the removal of that item being detected and tracked for internal auditing purposes or as part of a supplier-managed, on-site stocking service. Removal of the item may be detected by one or more types of sensors including, in the present application, a load cell or scale-like platform measuring device. Tracking of removals and subsequent replenishment may be performed by the controller of the dispensing unit itself or by electronic communications with a remote server and database.

When used for dispensing discrete items, the load cell or scale-like platform measuring device does not need to measure the precise weight of the stocked items, nor any precise difference in measured weight attributable to the removal of an item, but does need to accurately 'count' the stocked items by estimating the number of items from a measured property such as strain or rough weight. Gross errors in the measured property can cause a miscount or misestimation of the number of items present, the number of items removed, the number of items remaining, etc., and will tend to create discrepancies in the tracking of removed and replenished stock. For example, an item may partially rest or wedge against a side wall of the internal compartment, and the measured property (typically strain of a load cell) may be altered by friction or mechanical interference between the two that resists free movement of the platform. Thus, it may be useful to provide a bin, supported by or integrated with the platform, to keep stocked items within the confines of the platform. In addition, customers following lean manufacturing methodologies such as 5S (Sort, Set in Order, Shine, Standardize, and Sustain) may prefer that the items within a bin be orderly and organized rather than merely piled within. Thus, it may be useful to provide a means for flexibly organizing items within the confines of the platform and bin.

Existing dispensing units generally use platform measuring devices supporting discrete bins, which may themselves shift and partially rest or wedge against a side wall of an internal compartment, or platforms having affixed or integral bins, where changes in the dispensed stock (particularly the size, height, width, or depth of an item) require removal of at least the platform portion of the device in order to alter the bin dimensions and configuration. However, applicants have developed a load cell bin system which may be altered without removal of either the platform or the overall platform measuring device from the dispensing unit, thus simplifying the process of changing bin dimensions and configurations when making changes to the dispensed stock.

SUMMARY

In one embodiment, the invention is a platform measuring device including a platform bin and a base member having a plurality of load cells configured to support the platform bin. The platform bin comprises a platform plate, a rear wall, and a plurality of side walls extending from the front of the platform plate to the rear wall so as to form an open-top, open-faced bin. The platform plate includes a front flange disposed below the upper surface of the plate to define a trough extending at least partially across the front of the platform plate. Each of the plurality of side walls includes a rear tab received within a slot in the rear wall and a depending front tab received within the trough. A cap member is removably secured over the trough to capture the depending front tabs within the trough, thereby securing the plurality of side walls in place.

In another embodiment, the invention is a platform measuring device including a platform bin and a base member having a plurality of load cells configured to support the platform bin. The platform bin comprises a platform plate, a front gate, a rear wall, and a plurality of side walls extending from the front gate to the rear wall so as to form an open-top, closed-faced bin. The platform plate includes a front flange disposed below the upper surface of the plate to define a trough extending at least partially across the front of the platform plate. Each of the plurality of side walls includes a rear tab received within a slot in the rear wall and a depending front tab received within the trough. A cap member is removably secured over the trough to capture the depending front tabs within the trough, thereby securing the plurality of side walls in place. The front gate is slidably engagable with the front ends of two of the plurality of side walls to close at least a portion of the front face of the bin.

DETAILED DESCRIPTION

Figure 1:
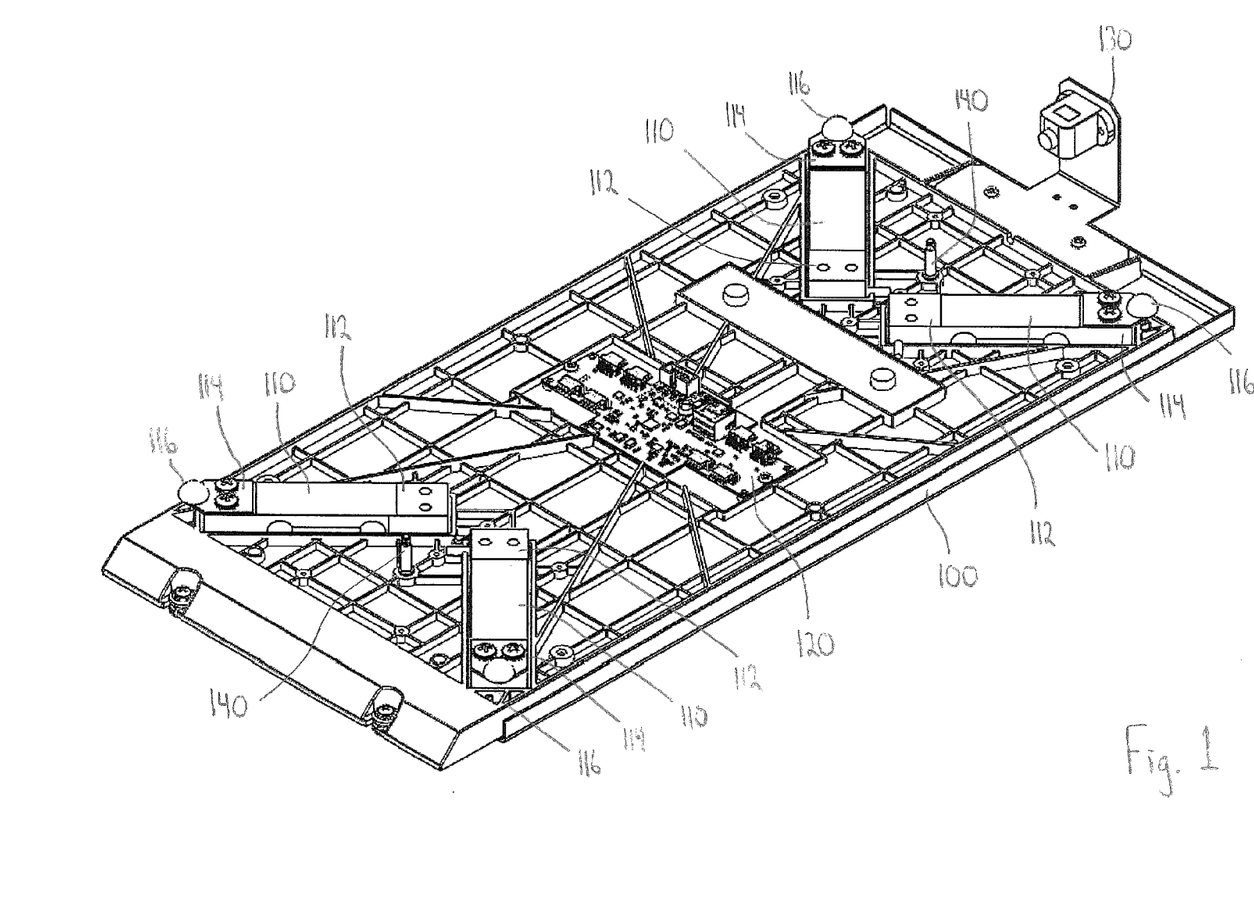
FIG. 1 is a front perspective view of a base member of the platform measuring device.
Figure 2:
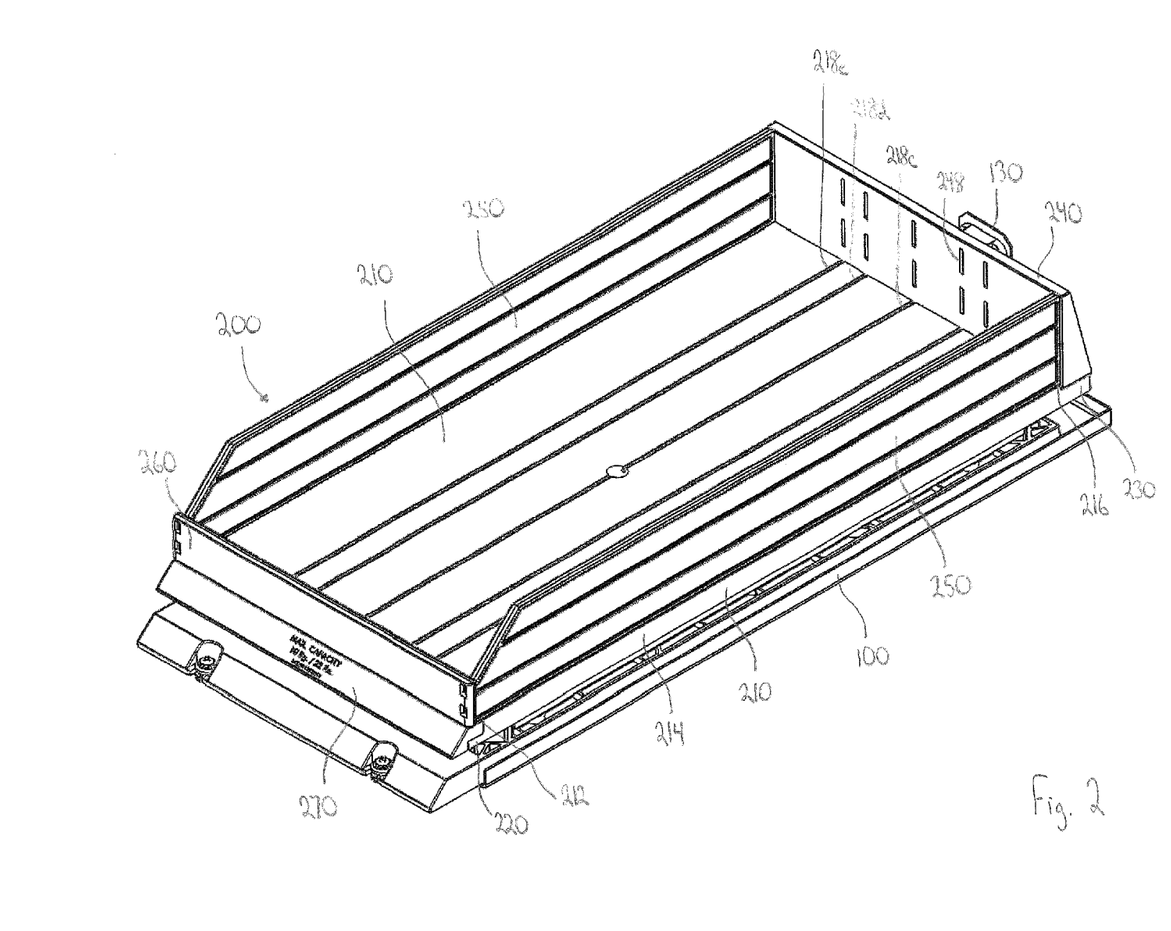
FIG. 2 is a front perspective view of the platform measuring device.

FIGS. 1 and 2 illustrate a platform measuring device for a dispensing unit (not shown) which may be used to store, display and/or dispense various items. The platform measuring device generally comprises a platform bin 200 and a base member 100 having a plurality of load cells 110 configured to support the platform member. Specifically, the base member 100 includes at least two, and more typically four, load cells 110 having an inward end 112 secured to the base member and an outward, cantilevered end 114 that may deflect in response to an applied load. The cantilevered end 114 preferably includes a boss 116 which serves to concentrate the load transferred from the platform bin 200 at a point, and the bosses 116 are preferably collectively positioned so as to support or mate with the platform bin 200 at its corners. The plurality of load cells 110 is electrically connected to a microprocessor board 120 which samples an analog signal from each load cell, typically an electrical resistance representative of the deformation or strain of that cell under the applied load, produces a measurement, and communicates that measurement to the dispensing unit via a communications port 130 (communications wiring omitted for sake of clarity). To ensure that the platform bin 200 contacts each load cell in the plurality of load cells 110, the base member 100 is typically preloaded by securing the platform bin 200 to the base member 100 using one or more hold-down bolts 140.

Figure 3A:
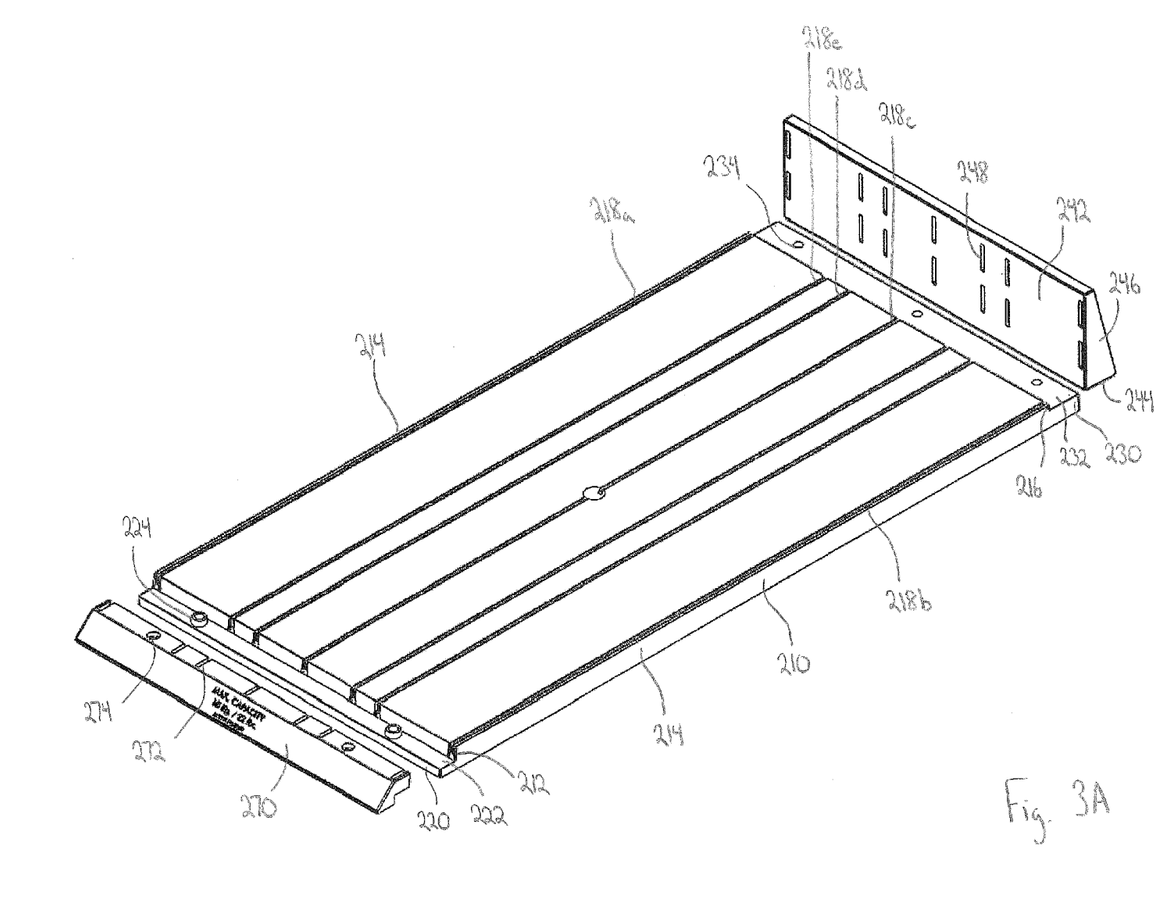
FIG. 3A is an exploded front perspective view of the platform plate, rear wall, and cap member.

Turning to FIG. 3A, the platform bin 200 comprises a generally flat, square or rectangular platform plate 210 having front, side, and rear edges 212, 214, and 216, respectively. The platform plate 210 also includes a front flange 220 disposed below the upper surface of the plate to define a trough 222 extending at least partially across the front edge 212 of the plate. As illustrated, the front flange 220 includes a plurality of apertures 224 for securing a cap member 270 over the front flange, but those of skill will appreciate that similar apertures may be provided in the front edge 212 of the platform plate 210 so that fasteners may be inserted parallel to, rather than perpendicular to, the upper surface of the plate. The platform plate may include a rear flange 230 disposed below the upper surface of the plate to define form another trough 232 extending across the rear edge 216 of the plate. As illustrated, the rear flange 230 includes a plurality of apertures 234 for securing a rear wall 240 to the rear flange and against the rear edge 212 of the platform plate 210, but those of skill will appreciate that other fasteners such as tabs and corresponding slots may be used, with tabs, slots, or combinations of tabs and slots being provided on the rear flange 230. It will also be appreciated that in other variants the rear wall 240 may be an integral part of a flange projecting perpendicular to the platform plate 210 from the rear edge 216. Finally, the platform plate 210 may include a plurality of channels 218 running from front edge 212 to the rear edge 214 along the upper surface of the plate. A pair of such channels 218a and 218b may be disposed proximate the side edges 216 of the platform plate 210 and configured to mate with the base of a side wall 250 to reinforce the side wall against lateral deflection. Other channels 218c, 218d, and 218e may be disposed between the pair of channels 218a, 218b to permit sidewall-like dividing walls (not shown) to divide the width of the platform bin 200 into halves, thirds, quarters, etc.

Returning to FIG. 2, the platform bin 200 further comprises a rear wall 240 disposed proximate to rear edge 216 (if provided as a discrete and separable part), side walls 250 disposed proximate the side edges 214, and, optionally, a front gate 260 disposed proximate the trough 222, so as to form the sides of a bin. In the illustrated embodiment, the rear wall 240 includes a first leg 242 projecting perpendicularly upward with respect to the platform plate 210, a second leg 244 extending parallel to the platform plate, and a plurality of triangular ribs 246 interconnecting the first and second legs. The rear wall 240 includes a plurality of slots 248 configured to receive tab elements of the side walls 250 and sidewall-like dividing walls. In variants where the platform plate 212 includes a plurality of channels 218, the slots may be aligned with the channels so as to define an array of planes oriented perpendicular to the upper surface of the platform plate 210. Different rear walls 240 having different heights may be secured to the rear flange 230 to create platform bins 200 having different bin depths. For instance, in dispensing units with a cabinet-of-drawers-like configuration, different rear walls having three inch, six inch, or nine inch heights may be installed to form a first wall of a bin having a three inch, six inch, or nine inch depth. Alternately, a single rear wall 240 having columns of slots 248 may be secured to the rear flange 230 to allow different side walls 250 having different heights to be installed.

Figure 3B:
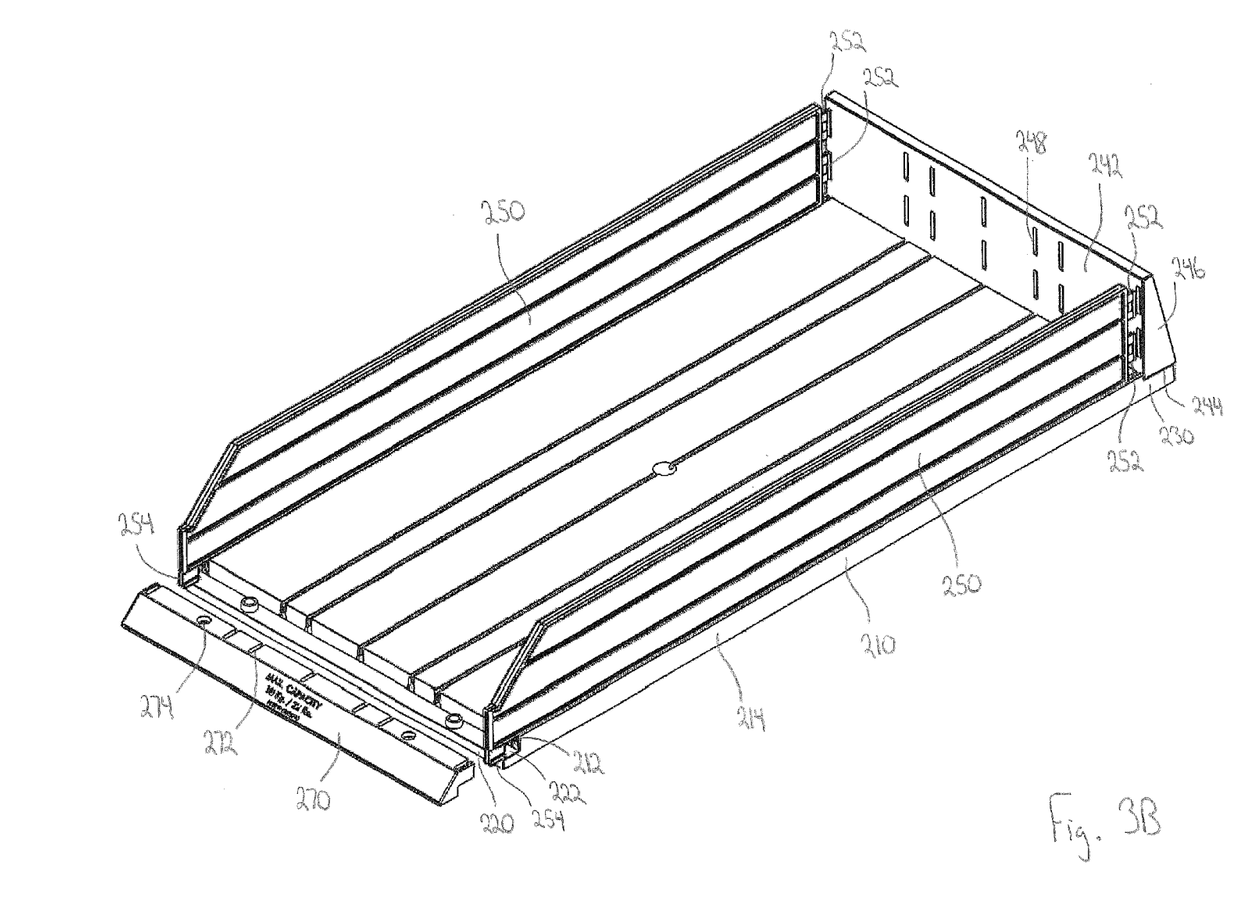
FIG. 3B is a partially exploded front perspective view of the platform plate, rear wall, cap member, and side walls.

Turning to FIG. 3B, the side walls 250 each include a rear tab 252 configured to be received within and engage with one of the plurality of slots 248. The side walls 250 also each include a depending front tab 254 configured to be received within the trough 222. In variants where the platform plate 212 includes a plurality of channels 218, the side walls 250 may include a base 256 which is configured to be received within one of the channels 218a and 218b to reinforce that side wall against lateral deflection; however, those of skill will appreciate that, depending upon the stiffness of the side wall material, the channel and mating base features are optional. Different side walls 250 having different heights may engage the slots 248 of rear wall 240 to create platform bins 200 having different bin depths. In addition, although not specifically shown, different sidewall-like dividing walls may include these same features, and be received within one of the slots 248 (and, where present, one of the channels 218c, 218d, 218e, etc.) to divide the width of the platform bin 200 into separate halves, thirds, quarters, etc. Also, although again not specifically shown, such sidewall-like dividing walls may include laterally-extending wall portions (e.g., portions extending perpendicular to both the platform plate 210 and the side walls 250) to divide the length of the platform into separate sub-bins. Advantageously, the side walls 250 and sidewall-like dividing walls may be removed by pulling these elements in the direction of the front edge 212 to disengage and withdraw the rear tab or tabs 252 from the slot or slots 248, then lifting (if the platform measurement device has been installed within a cabinet-of-drawers-like dispensing unit) or continuing to pull (if the platform measurement device has been installed within a locker-like dispensing unit) the element from the dispensing unit. Different side walls 250 or dividing walls may be installed by reversing this process. Particularly advantageously, both the removal and installation of different side walls and/or dividing walls may be performed without removal of the rear wall 240, platform plate 210, or the overall device itself, even from dispensing units with front-accessible, locker-like configurations.

Figure 3C:
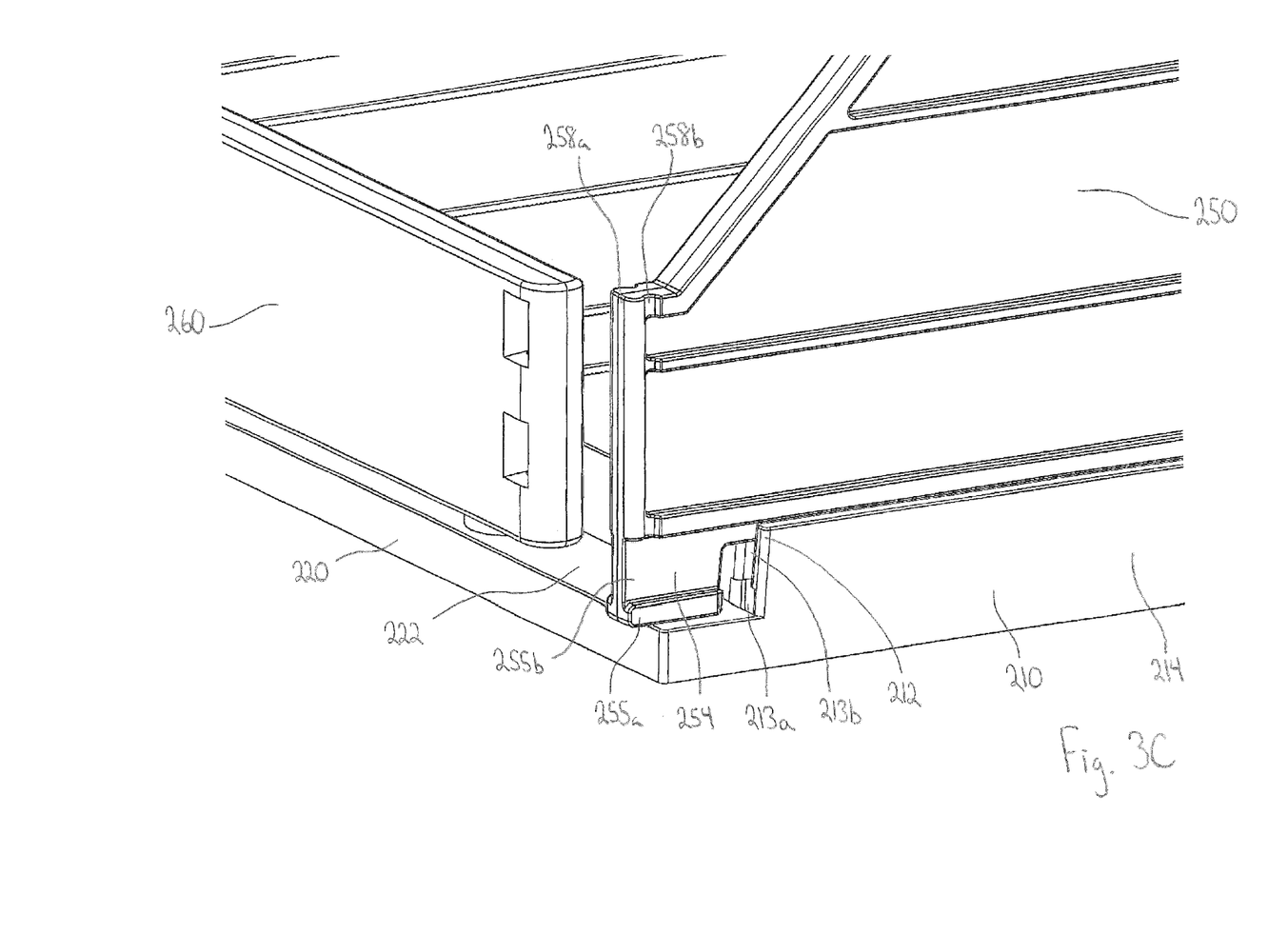
FIG. 3C is a detail view of the front edge and front flange of the platform plate, as well as corresponding portions of a side wall and front gate.

Turning to FIG. 3C, the depending front tab 254 may have varying shapes, such as an illustrated inverted "T" shape, an upright "L" shape, or any shape in which a horizontal rail feature 255a is connected to the body of the side wall 250 by a narrowed neck 255b. As discussed in the following paragraph, the rail feature 255a and neck 255b are engaged by cap member 270 to secure the side wall 250 against withdrawal from the trough 222. As further shown in this figure, the front edge 212 of the platform plate 218 may include an undercut portion 213a engageable with the rail feature 255a and/or a vertical channel 213b engageable with the narrowed neck 255b to maintain the sidewall in a fixed lateral position prior to installation of the cap member 270. The front-most end of some side walls 250 may include a vertical rail feature 258a connected to the body of the side wall by a narrowed neck 258b. As discussed in later paragraphs, the rail feature 258*a* and neck 258*b* may be engaged by the lateral ends of the front gate 260 to form a front corner of a closed-faced bin.

Figure 4:
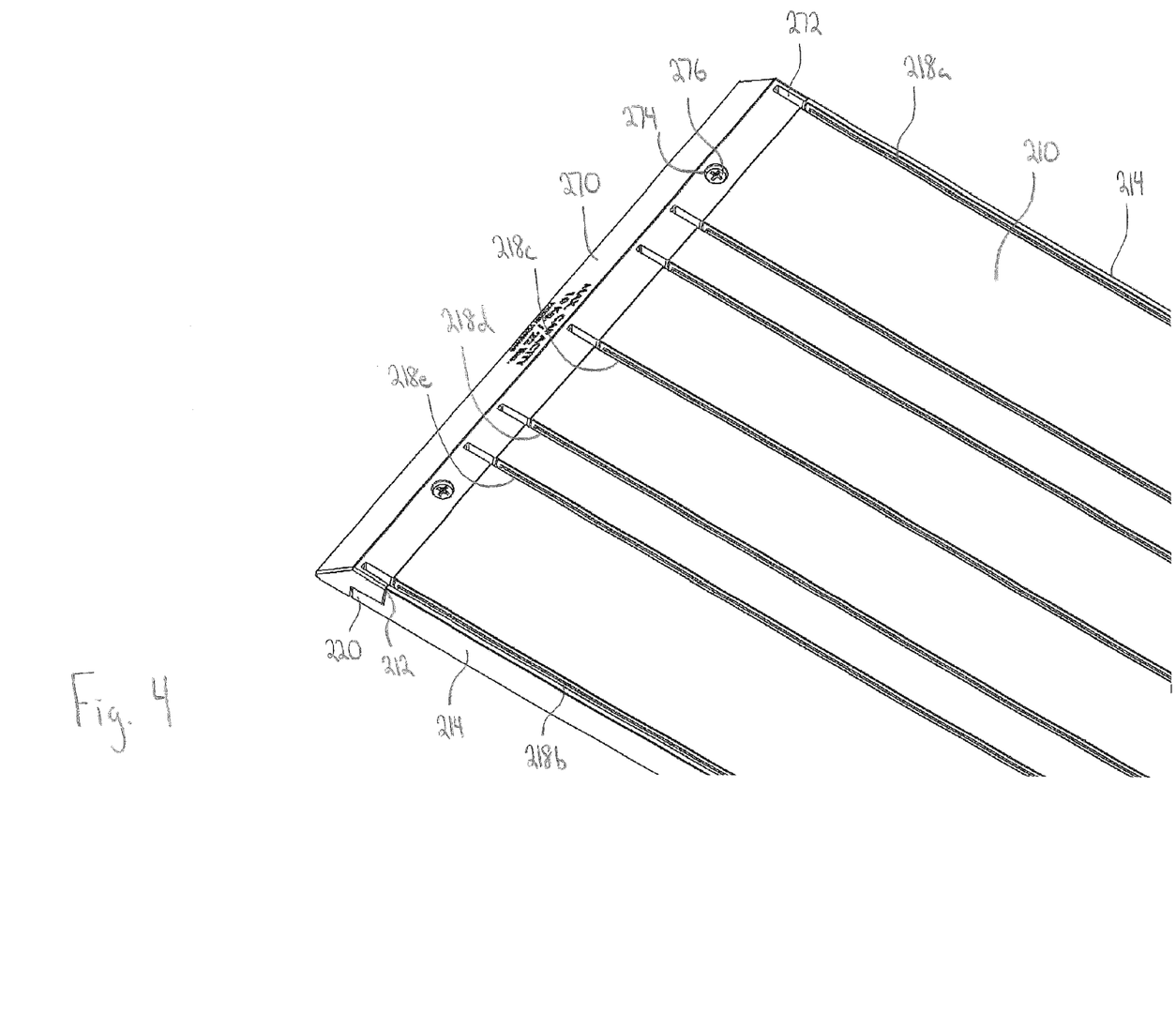
FIG. 4 is detail view of the platform plate with attached cap member (omitting the front gate and side wall elements)

As shown in FIGS. 3A, 3B, and 4, the cap member 270 includes a plurality of rearwardly open-ended slots 272 which are longitudinally (front-to-rear) aligned with the slots 248 of the rear wall 240. In variants where the platform plate 212 includes a plurality of channels 218, the slots 272 may be aligned with both the slots 248 of the rear wall 240 and the channels so as to define an array of planes oriented perpendicular to the upper surface of the platform plate 210. The rearwardly open-ended slots 272 are adapted to slidably engage the narrowed neck 255*b* of a depending front tab 254, and may include undercut portions (not shown) adapted to slidably engage the horizontal rail feature 255*a* of that same tab. Alternately, the rearwardly open-ended slots 272 may connect to one or more central cavities (not shown) adapted to receive the horizontal rail feature 255*a*, with interference between the horizontal rail feature 255*a* and the walls of the open-ended slots 272 serving to prevent pull-out of the depending front tab 254 from the cap member 270. Cap member 270 may also include a plurality of apertures 274, configured to be aligned with apertures 224 upon installation, for receiving reversible fasteners 276, such as headed pins, screws, or the like. Advantageously, the cap member 270 may be removed (after removal of the fastener) by pulling the member away from the front edge 212 of the platform plate 210 to disengage from the depending front tabs 254 of the plurality of side walls 250, then lifting (if the platform measurement device has been installed within a cabinet-of-drawers-like dispensing unit) or continuing to pull (if the platform measurement device has been installed within a locker-like dispensing unit) the element from the dispensing unit.

In a first embodiment, optional front gate 260 may be omitted so as to form an open-topped, open-faced bin. The platform bin 200 of such an embodiment may be used with front-accessed, locker-like dispensing units where the user or stockperson is likely to recognize that an item has been incorrectly placed and to reposition that item to avoid striking the item with the compartment door. The platform bin 200 of such an embodiment may also be useful in the higher tiers of locker-like dispensing units in order to avoid obstructing the user's view and/or ability to reach a desired item. However, in other embodiments optional front gate 260 may be included so as to form an open-topped, partially closed-faced or fully closed-faced bin. The platform of such an embodiment may be used in middle or lower tiers of locker-like dispensing units in order to isolate an item from the compartment door and where the user's view and/or reach is unlikely to be obstructed, or in top-accessed, chest-of-drawers-like dispensing units where a fully closed-faced bin is desired.

Figure 5:
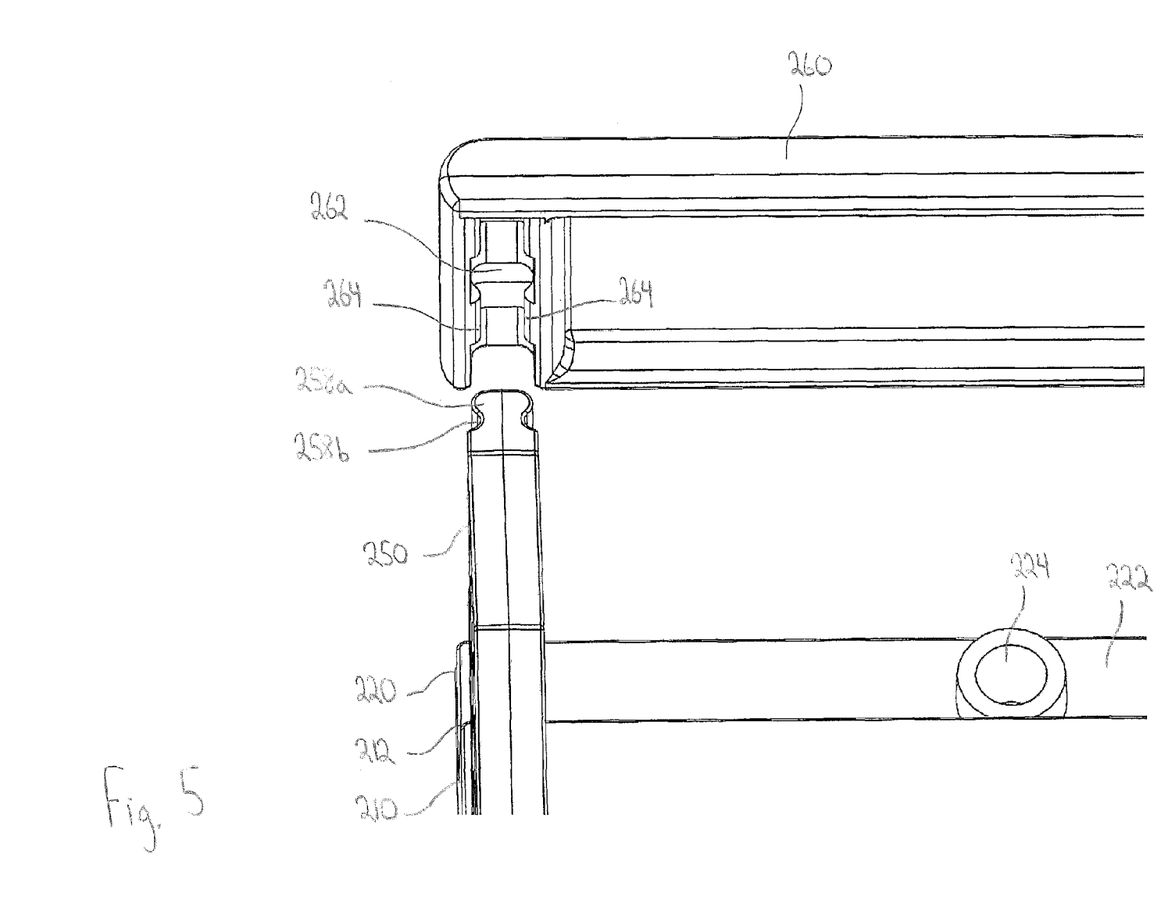
FIG. 5 is a detail view of the rear of the front gate.

Turning to FIG. 5, the lateral ends of the optional front gate 260 each define a rearwardly open-ended, "C" shaped vertical channel 262 adapted to receive the vertical rail feature 258*a* of a side wall 250. Those of skill will appreciate that the channel 262 is described as being "C" shaped, as opposed to "U" shaped, because the lateral ends of the front gate 260 each include a pair of arms 264 which project laterally inward across the channel 262 and toward the narrowed neck 258*b* of a received side wall 250, partially closing the vertical channel 262 to form a sliding joint between the front gate 260 and the side wall 250. Advantageously, the front gate 260 may be removed by pulling this element up and away from the platform plate 210 so as slide the walls of the vertical channel 252 along the vertical rail feature 258*a* of the side walls 250 proximate the side edges 214 of the platform plate 210. Different front gates 260 having different heights may be installed by reversing this process. Particularly advantageously, both the removal and installation of different front gates may be performed without removal of the rear wall 240, platform plate 210, or the overall device itself, even from dispensing units with front-accessible, locker-like configurations.

Although the invention is shown and described with respect to certain embodiments, it should be clear that modifications will occur to those skilled in the art upon reading and understanding the specification. For example, the reader will appreciate that even through any sidewall-like dividing walls need not include a rail feature 258*a* and narrowed neck 258*b*, and that medial portions of the front gate 260 need not include vertical channels 262 for receiving and engaging such feature, such features may be included in order to allow the side walls 250 and sidewall-like dividing walls to be interchangeable, even structurally identical elements. The present disclosure is consequently not limited to the illustrated embodiments, and includes each of the many combinations, variants, alternatives, and suggested modifications disclosed herein.

What is claimed is:

1. A platform measuring device comprising:
   a platform bin having a platform plate, a rear wall, and a plurality of side walls extending from the front of the platform plate to the rear wall so as to form an open-top, open-faced bin; and
   a base member having a plurality of load cells configured to support the platform bin;
   wherein the platform plate includes a front flange disposed below the upper surface of the platform plate to define a trough extending at least partially across the front of the platform plate, and each of the plurality of side walls includes a rear tab that is received within a slot in the rear wall and a depending front tab that is received within the trough; and
   a cap member removably securable over the trough to capture the depending front tabs within the trough.

2. The platform measuring device of claim 1, wherein the platform plate includes a rear flange disposed below the upper surface of the platform plate to define a trough extending across the rear of the platform plate, and the rear wall is secured within the trough extending across the rear of the platform plate, against a rear edge of the upper surface of the platform plate.

3. The platform measuring device of claim 1, wherein the rear wall is an integral part of a flange projecting perpendicularly from the platform plate along a rear edge of the platform plate.

4. The platform measuring device of claim 1, wherein the platform plate includes a plurality of channels running from a front edge of the upper surface of the platform plate to a rear edge of the upper surface of the platform plate.

5. The platform measuring device of claim 4, wherein two of the plurality of channels are disposed proximate the side edges of the platform plate and each of those two is configured to mate with a base of a side wall of the plurality of side walls to reinforce said side wall against lateral deflection.

6. The platform measuring device of claim 4, wherein the plurality of channels is disposed so as to divide the width of the platform bin into increments.

7. The platform measuring device of claim 1, wherein the depending front tab comprises a rail connected to the respective side wall by a narrowed neck.

8. The platform measuring device of claim 7, wherein a front edge of the platform plate adjacent the front flange includes an undercut portion engaging the rail of the depending tab.

9. The platform measuring device of claim 7, wherein a front edge of the platform plate adjacent the front flange includes a channel engaging the narrowed neck of the depending tab.

10. The platform measuring device of claim 1, wherein the cap member includes a plurality of rearwardly open-ended slots which are longitudinally aligned with the slots of the rear wall.

11. A platform measuring device comprising:
a platform bin having a platform plate, a front gate, a rear wall, and a plurality of side walls extending from the front of the platform plate to the rear wall so as to form an open-top, closed-faced bin; and
a base member having a plurality of load cells configured to support the platform bin;
wherein the platform plate includes a front flange disposed below the upper surface of the platform plate to define a trough extending at least partially across the front of the platform plate, and each of the plurality of side walls includes a rear tab that is received within a slot in the rear wall and a depending front tab that is received within the trough;
wherein the front gate includes a pair of lateral ends which slidably engage with front- most ends of two of the plurality of side walls to form front corners of the closed-face bin; and
a cap member removably securable over the trough to capture the depending front tabs within the trough.

12. The platform measuring device of claim 11, wherein the lateral ends of the front gate define rearwardly-open, C-shaped vertical channels, and said front-most ends include a vertical rail and a narrowed neck.

13. The platform measuring device of claim 11, wherein the platform plate includes a rear flange disposed below the upper surface of the platform plate to define a trough extending across the rear of the platform plate, and the rear wall is secured within the trough extending across the rear of the platform plate, against a rear edge of the upper surface of the platform plate.

14. The platform measuring device of claim 11, wherein the platform plate includes a plurality of channels running from a front edge of the upper surface of the platform plate to a rear edge of the upper surface of the platform plate.

15. The platform measuring device of claim 14, wherein two of the plurality of channels are disposed proximate the side edges of the platform plate and each of those two is configured to mate with a base of a side wall of the plurality of side walls to reinforce said side wall against lateral deflection.

16. The platform measuring device of claim 14, wherein the plurality of channels is disposed so as to divide the width of the platform bin into increments.

17. The platform measuring device of claim 11, wherein the depending front tab comprises a horizontal rail connected to the respective side wall by a narrowed neck.

18. The platform measuring device of claim 17, wherein a front edge of the platform plate adjacent the front flange includes an undercut portion engaging the horizontal rail of the depending tab.

19. The platform measuring device of claim 17, wherein a front edge of the platform plate adjacent the front flange includes a channel engaging the narrowed neck of the depending tab.

20. The platform measuring device of claim 11, wherein the cap member includes a plurality of rearwardly open-ended slots which are longitudinally aligned with the slots of the rear wall.

* * * * *